(12) United States Patent
Jang et al.

(10) Patent No.: US 8,619,229 B2
(45) Date of Patent: Dec. 31, 2013

(54) BACK LIGHT ASSEMBLY AND LIQUID CRYSTAL DISPLAY INCLUDING THE SAME

(75) Inventors: Se-Hoon Jang, Yongin (KR); Chang-Sub Jung, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 162 days.

(21) Appl. No.: 13/190,590

(22) Filed: Jul. 26, 2011

(65) Prior Publication Data
US 2012/0050648 A1 Mar. 1, 2012

(30) Foreign Application Priority Data

Aug. 25, 2010 (KR) .................. 10-2010-0082561

(51) Int. Cl.
*G02F 1/1345* (2006.01)
*G02F 1/1333* (2006.01)

(52) U.S. Cl.
USPC .......................................... 349/150; 349/58

(58) Field of Classification Search
USPC ................................... 349/58, 150
See application file for complete search history.

(56) References Cited

U.S. PATENT DOCUMENTS

| | | | |
|---|---|---|---|
| 5,436,745 A * | 7/1995 | Voisin et al. ................ 349/58 |
| 7,192,177 B2 * | 3/2007 | Chang et al. ................ 362/631 |
| 7,360,940 B2 * | 4/2008 | Chang et al. ................ 362/631 |
| 7,708,449 B2 * | 5/2010 | Eda ................................ 362/631 |
| 7,728,945 B2 * | 6/2010 | Liu et al. ...................... 349/149 |
| 7,929,100 B2 * | 4/2011 | Kim ................................ 349/150 |
| 8,016,476 B2 * | 9/2011 | Chen et al. .................... 362/631 |
| 8,031,293 B2 * | 10/2011 | Lin et al. ....................... 349/65 |

FOREIGN PATENT DOCUMENTS

| | | |
|---|---|---|
| JP | 2009-099340 | 5/2009 |
| KR | 10-2007-0037800 | 4/2007 |
| KR | 10-2008-0034650 | 4/2008 |
| KR | 10-2009-0081184 | 7/2009 |
| KR | 10-2009-0088284 | 8/2009 |
| KR | 10-2009-0100117 | 9/2009 |

* cited by examiner

*Primary Examiner* — James Dudek
(74) *Attorney, Agent, or Firm* — Robert E. Bushnell, Esq.

(57) ABSTRACT

A backlight assembly has improved luminance and uniformity, and a liquid crystal display includes the backlight assembly. The backlight assembly may be constructed with a light source; a flexible printed circuit board including a base film and conductors, and mounted with the light source; a light guide panel into which light emitted from the light source is incident; and a mold frame including an opening for receiving the light guide panel and a boss for fixing the flexible printed circuit board. The flexible printed circuit board is provided with an insertion hole into which the boss is inserted, and the conductors are formed along the circumference of the insertion hole.

18 Claims, 4 Drawing Sheets

BACK LIGHT ASSEMBLY AND LIQUID CRYSTAL DISPLAY INCLUDING THE SAME

CLAIM OF PRIORITY

This application makes reference to, incorporates the same herein, and claims all benefits accruing under 35 U.S.C. §119 from an application earlier filed in the Korean Intellectual Property Office on Aug. 25, 2010 and there duly assigned Serial No. 10-2010-0082561.

BACKGROUND OF THE INVENTION

1. Field of the Invention

The present invention relates generally to a backlight assembly and a liquid crystal display including the same, and more particularly, to a backlight assembly with improved luminance and uniformity, and a liquid crystal display including the same.

2. Description of the Related Art

A liquid crystal display (LCD) has advantages, such as slimness, lightness, and low power consumption, such that it replaces the existing cathode ray tube (CRT). As a result, the liquid crystal display (LCD) has been prevalently used for midsize and large products, such as a monitor and a TV, and small-sized products, such as mobile phones, personal digital assistants (PDAs), and portable multimedia players (PMPs).

Generally, the liquid crystal display (LCD) includes a liquid crystal display panel using optical properties of a liquid crystal, and the LCD drives the liquid crystal display panel, thereby displaying image data. However, liquid crystal used for the liquid crystal display panel does not perform self emission, such that it requires a separate light source.

Therefore, a back surface of the liquid crystal display panel is provided with a backlight assembly including a light source and a light guide panel for receiving light emitted from the light source and for diffusing the light, such that light is irradiated to the liquid crystal display panel through the backlight assembly, thereby implementing identifiable images. As the light source included in the backlight assembly, the light emitting diode (LED) may be used. The LED may be used by being disposed on one side surface of the light guide panel.

In the backlight assembly, in order to maintain a uniform luminance of the backlight at a predetermined level or more, light emitted from a light source should be uniformly incident onto the light guide panel without light loss. If the light source is not closely attached to the light guide panel, and thus a gap is generated therebetween, light loss such as leakage of light occurs, thereby deteriorating the luminance of the backlight. In addition, when the light source is wrongly disposed during the disposition on the side surface of the light guide panel, etc., light is not uniformly inputted to generate hot spots or dark portions, etc., thereby deteriorating the uniformity of the backlight.

The above information disclosed in this Background section is only for enhancement of an understanding of the background of the described technology, and therefore it may contain information which does not form the prior art which is already known in this country to a person of ordinary skill in the art.

SUMMARY OF THE INVENTION

The present invention has been developed in an effort to provide a backlight assembly having the advantages of improving luminance and uniformity of a backlight by closely attaching a light source to a light guide panel in the backlight assembly, and a liquid crystal display including the same.

An exemplary embodiment of the invention provides a backlight assembly which may include a light source; a flexible printed circuit board including a base film and a conductor, and mounted with the light source; a light guide panel into which light emitted from the light source is incident; and a mold frame including an opening for receiving the light guide panel and a boss for fixing the flexible printed circuit board. The flexible printed circuit board may be provided with an insertion hole into which the boss is inserted, and the conductors may be formed along the circumference of the insertion hole.

The conductors formed along the circumference of the insertion hole may be formed in a band shape.

The inner diameter of the conductor formed along the circumference of the insertion hole may be the same as the inner diameter of the insertion hole.

The base film may be formed on a lower portion of the conductor formed along the circumference of the insertion hole, and the inner diameter of the base film may be the same as the inner diameter of the insertion hole.

The flexible printed circuit board may further include a second conductor formed on a lower portion of the base film along the circumference of the insertion hole.

The flexible printed circuit board may further include an insulating film formed on an upper portion of the conductor.

The inner diameter of the insertion hole may be larger, by 5% to 15%, than the outer diameter of the boss.

The conductor may be formed of a copper foil

The base film may include any one of polyimide (PI), polyester (PET), and polyethylene naphthalate (PEN).

The backlight assembly may further include an adhesive formed between the conductor and the base film.

Another exemplary embodiment of the invention provides a liquid crystal display which may include a liquid crystal display panel and a backlight assembly, wherein the backlight assembly includes a light source; a flexible printed circuit board including a base film and a conductor, and mounted with the light source; a light guide panel into which light emitted from the light source is incident; and a mold frame including an opening for receiving the light guide panel and a boss for fixing the flexible printed circuit board. The flexible printed circuit board may be provided with an insertion hole into which the boss is inserted and the conductors may be formed along the circumference of the insertion hole.

The conductors formed along the circumference of the insertion hole may be formed in a band shape.

The inner diameter of the conductor formed along the circumference of the insertion hole may be the same as the inner diameter of the insertion hole.

The base film may be formed on a lower portion of the conductor formed along the circumference of the insertion hole, and the inner diameter of the base film may be the same as the inner diameter of the insertion hole.

The flexible printed circuit board may further include a second conductor formed on a lower portion of the base film along the circumference of the insertion hole.

The flexible printed circuit board may further include an insulating film formed on an upper portion of the conductor.

The inner diameter of the insertion hole may be larger, by 5% to 15%, than the outer diameter of the boss.

The conductor may be formed of a copper foil.

The base film may include any one of polyimide, polyester, and polyethylene naphthalate.

The backlight assembly may further include an adhesive formed between the conductor and the base film.

According to the exemplary embodiments of the invention, it is possible to improve the luminance of the backlight by closely attaching the light source to the light guide panel in the backlight assembly.

In addition, according to the exemplary embodiments, it is possible to improve the uniformity of the backlight by preventing the light source and the light guide panel from being disposed outside each other.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
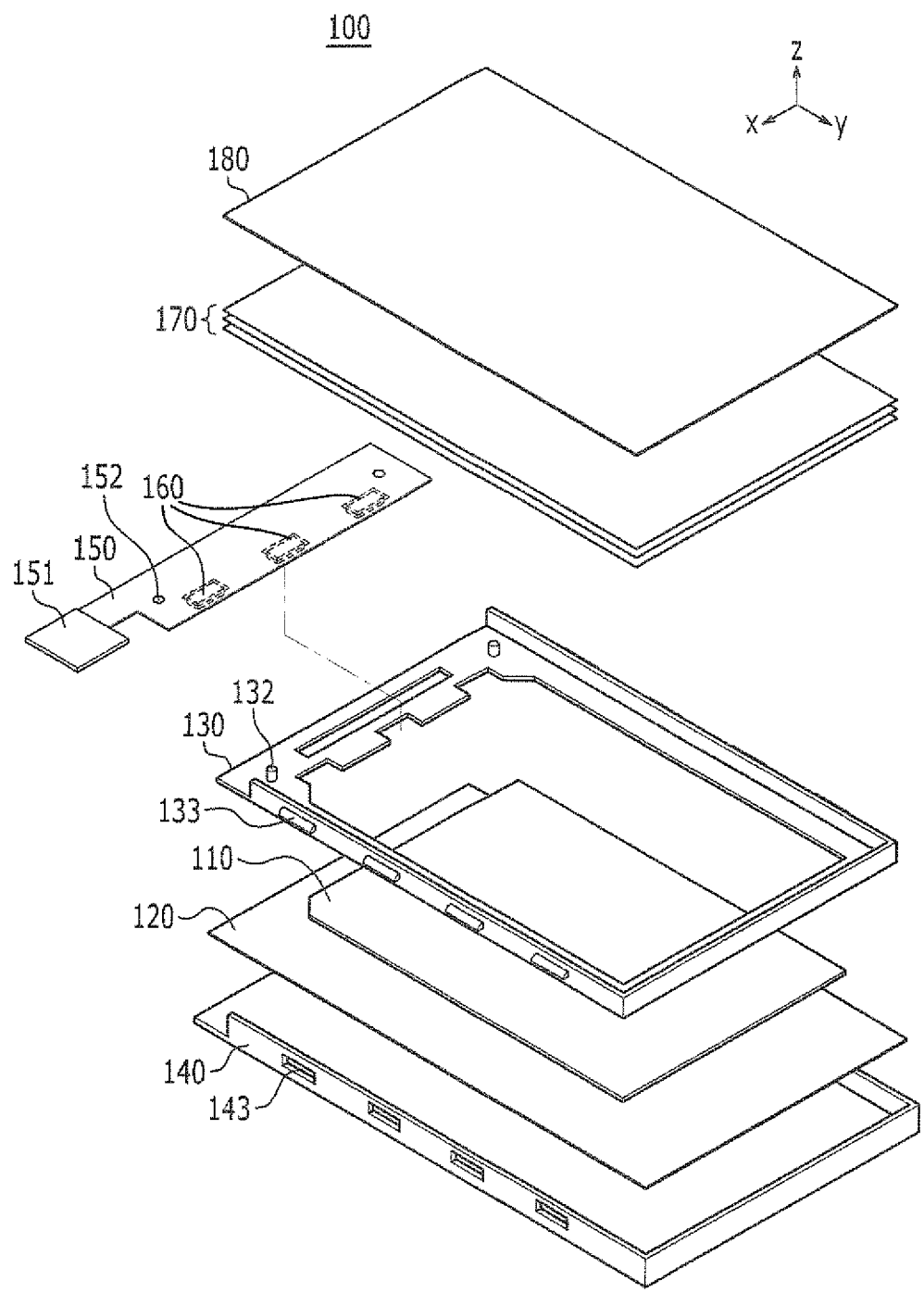
FIG. 1 is an exploded perspective view of a backlight assembly according to a first exemplary embodiment of the invention.

The present invention will be described more fully hereinafter with reference to the accompanying drawings, in which exemplary embodiments of the invention are shown.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto. It will be understood that, when an element such as a layer, film, region, or substrate is referred to as being "on" another element, it can be directly on the other element or intervening elements may also be present.

FIG. 1 is an exploded perspective view of a backlight assembly according to a first exemplary embodiment of the invention.

Referring to FIG. 1, a backlight assembly 100 according to the first exemplary embodiment includes a light source, a light guide panel 110, and a mold frame 130. In addition, the backlight assembly 100 may further include a reflective member 120, a flexible printed circuit board (FPCB) 150, optical members 170, and an adhesive member 180, and may further include a lower fixing member 140 for receiving the above-mentioned components of the backlight assembly 100.

In the first exemplary embodiment, a light emitting diode (LED) 160 is used as the light source, and the LED 160 is mounted on the flexible printed circuit board 150 so as to be disposed on one side surface of the light guide plate 110. The flexible printed circuit board 150 is provided with a plurality of wire patterns (not shown) so as to be electrically connected to the light emitting diode 160. As a result, the flexible printed circuit board 150 receives a driving voltage through a connection part 151 from the outside, thereby making it possible to drive the light emitting diode 160.

FIG. 1 shows a case wherein three light emitting diodes 160 are mounted on the flexible printed circuit board 150, which is only an example of the present invention. Therefore, the present invention is not limited thereto, and a different number of light emitting diodes 160 may be used according to the size and usage of the backlight assembly 100.

The mold frame 130 receives the flexible printed circuit board 150, on which the light emitting diodes 160 are mounted, and the light guide panel 110, and fixes them. In detail, the light guide panel 110 is received in a central opening of the mold frame 130, and the flexible printed circuit board 150 is fixed so as to be disposed at an edge of one side of the mold frame 130. In this case, a boss 132 is disposed on one side surface of the light guide panel 110, and the boss 132 of the mold frame 130 is inserted into the flexible printed circuit board 150, so as to form insertion holes 152 for coupling the flexible printed circuit board 150 to the mold frame 130. Therefore, the light emitting diodes 160 mounted on the flexible printed circuit board 150 are arranged so as to face the side surface of the light guide panel 110, and light emitted from the light emitting diodes 160 is incident on the side surface of the light guide panel 110, and is uniformly diffused over light guide panel 110.

A reflective member 120 may be disposed in lower-surface direction (−Z direction) of the light guide panel 110, and an optical member 170 may be disposed in an upper-surface direction (+Z direction) of the light guide panel 110. Therefore, light diffused from the light guide panel 110 and emitted in the upper-surface direction (+Z direction) faces optical member 170, and light emitted in the lower-surface direction (−Z direction) is reflected from the reflective member 120 and again faces the optical member 170. The optical member 170 may include a diffusion sheet, a prism sheet, a protective sheet, etc, such that light passing therethrough is vertically incident onto the liquid crystal display panel. Light loss may be minimized by the disposition of the light guide panel 110, the reflective member 120, and the optical member 170. Meanwhile, the adhesive member 180 for bonding the optical member 170 to the liquid crystal display panel may be formed on the optical member 170.

As described above, since the mold frame 130 may receive other components of the backlight assembly 100 and directly contact them, it may be made of a buffering material having weak strength, such as resin, capable of absorbing external impact, thereby making it possible to protect other components. As such, when the mold frame 130 is made of the material having weak strength, a lower fixing member 140 may be formed to supplement the strength of the mold from 130, thereby protecting the components of the backlight assembly 100 from external impact. The lower fixing member 140 may be made of a metal material such as stainless steel, and the side surface of the lower fixing member 140 may be provided with a plurality of fastening holes 143 to be coupled with a fastening protrusion 133 of the mold frame 130.

Figure 2:
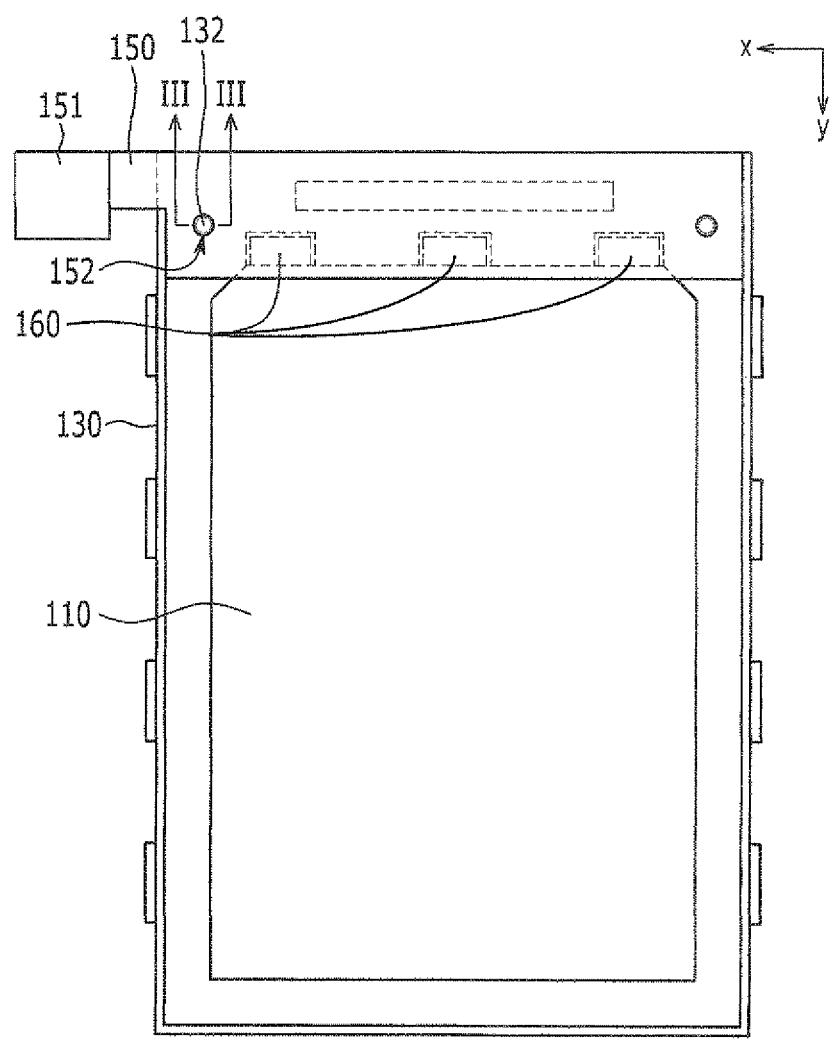
FIG. 2 is a plan view of a backlight assembly according to the first exemplary embodiment of the invention.

FIG. 2 is a plan view of a backlight assembly according to the first exemplary embodiment of the invention. Referring to FIG. 2, the light guide panel 110 is received in the opening of the mold frame 130, and the boss 132 of the mold frame 130 is inserted into the insertion holes 152 of the flexible printed circuit board 150, such that the flexible printed circuit board 150 is fixed to the mold frame 130. In this case, the insertion holes 152 of the flexible printed circuit board 150 and the boss of the mold frame 130 are disposed so that the light emitting diodes 160 may be closely attached to the light guide panel 110, when they are coupled with each other.

As such, in the first exemplary embodiment, the light emitting diodes 160 mounted on the flexible printed circuit board 150 are disposed so as to be closely attached to one side surface of the light guide panel 110. Hereinafter, the configuration for closely attaching the light emitting diodes 160 to the light guide panel 110 will be described in detail.

Figure 3:
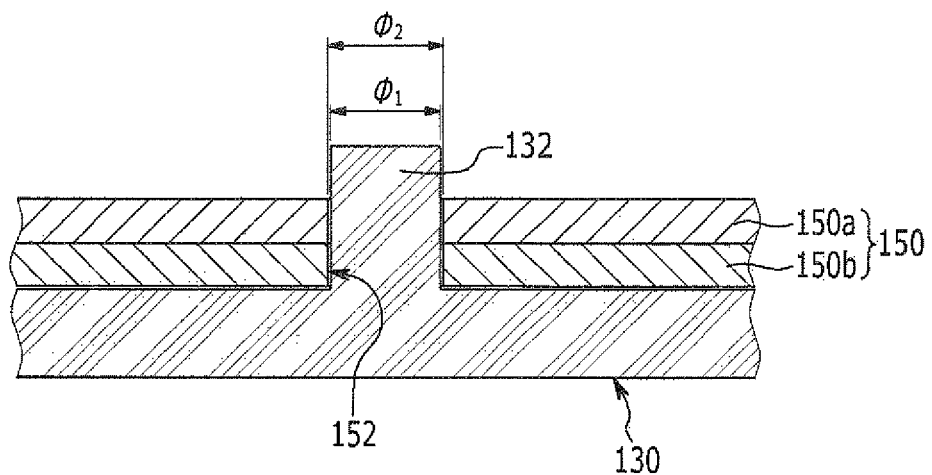
FIG. 3 is a cross-sectional view of a combination of a flexible printed circuit board and a mold frame according to the first exemplary embodiment taken along the line III-III of FIG. 2.

FIG. 3 is a cross-sectional view of a combination of a flexible printed circuit board and a mold frame according to the first exemplary embodiment taken along the line III-III of FIG. 2.

Referring to FIG. 3, the flexible printed circuit board 150 according to the first exemplary embodiment includes a conductor 150a and a base film 150b.

The base film 150b has excellent insulation, heat resistance, moisture resistance, and flexibility. In the first exemplary embodiment, the base film 150b is made of any one of polyimide (PI), polyester (PET), and polyethylene naphthalate (PEN), in consideration of the above-mentioned characteristics. In addition, the conductor 150a is formed of a copper foil having excellent flexibility and conductivity. However, these materials are by way of example only, and therefore the present invention is not limited thereto.

The conductor 150a forms a circuit on the base film 150b. A circuit is formed by stacking the conductor 150a on the base film 150b and then removing an unnecessary portion by etching, or a circuit is formed by forming a resist pattern on the base film 150b and then forming the conductor 150a by using electroless plating.

An adhesive (not shown) may be further formed between the base film 150b and the conductor 150a. In this case, as the adhesive, a mixture of epoxy and acryl mixed at an appropriate ratio may be used. In addition, the upper portion of the conductor 150a may be further provided with an insulating film (not shown) in order to insulate the conductor 150a and protect it from external factors.

As described above, the flexible printed circuit board 150 is provided with the insertion holes 152 so as to couple the flexible printed circuit board 150 to the mold frame 130. Generally, the insertion holes are formed by punching holes in the base film in a state wherein the conductors therearound are removed. That is, the conductor is used to form the circuits and the conductors around the insertion holes are not formed.

Meanwhile, the boss 132 inserted into the insertion hole 152 may have an external force applied thereto in a horizontal direction due to external factors, such as impact during the assembly of the backlight assembly or the use of the liquid crystal display (LCD). If the insertion holes are formed by forming holes in the base film, the base film is made of polyimide, polyester, polyethylene naphthalate, etc., with weak strength, such that there may be a problem in that the boss 132 having the external force applied thereto in a horizontal direction is not fixed. That is, even though the boss 132 is surrounded by the base film 150b, the base film 150b is pushed in a direction of the applied external force by the boss 132, and is thus deformed. As a result, the boss 132 is moved. Therefore, the mold frame 130 and the flexible printed circuit board 150 are not coupled at a defined position, such that the light emitting diode 160 mounted on the flexible printed circuit board 150 may not be closely attached to the side surface of the light guide panel 110, or may be disposed so as to be outside the light guide panel 110, that is, biased to one side of the light guide panel.

However, referring to FIG. 3, in the first exemplary embodiment, the conductor 150a having a strength higher than that of the base film 150b is formed around the insertion hole 152, such that the boss 132 is stably fixed in the insertion hole 152.

According to the first exemplary embodiment, the conductor 150a and the base film 150b are formed along a circumference of the insertion hole 152 in the flexible printed circuit board 150. That is, holes are formed in the conductor 150a and the base film 150b, respectively, and the holes communicate with each other so as to form the insertion holes 152. In this case, the inner diameter of the conductor 150a, formed along the circumference of the insertion hole 152, is formed so as to be the same as the inner diameter of the insertion hole 152 and the inner diameter of the base film 150b is also formed so as to be the same as the inner diameter of the insertion hole 152.

In the first exemplary embodiment, the inner diameter $\phi_2$ of the insertion hole 152 is formed so as to be larger than the outer diameter $\phi_1$ of the boss 132 so that the boss 132 of the mold frame 130 may be easily inserted into the insertion hole 152 of the flexible printed circuit board 150. In detail, in order to minimize the space in which the boss 132 may be moved, while considering the tolerance at the time of forming the boss 132 and the insertion hole 152, the inner diameter $\phi_2$ of the insertion hole 152 is formed so as to be larger, by about 5 to 15%, than the outer diameter $\phi_1$ of the boss 132. For example, when the outer diameter $\phi_1$ of the boss 132 is formed at 1.0 mm, the inner diameter $\phi_2$ of the insertion hole 152 (i.e., the inner diameter of each of the conductor 150a and the base film 150b) may be formed at about 1.05 mm to 1.15 mm.

As such, the conductor 150a having strong strength is formed at the circumference of the insertion hole 152 of the flexible printed circuit board 150, such that the boss 132 may be stably fixed in the insertion hole 152 without moving in a horizontal direction, even when an external force is applied during the assembly of the backlight assembly or the use of the liquid crystal display. Therefore, the light emitting diode 160 can be stably attached to the one side surface of the light guide panel 110, and light emitted from the light emitting diode 160 is uniformly directed into the light guide panel 110 without being leaked, thereby making it possible to improve the luminance and uniformity of the backlight.

Meanwhile, in order to fix flexible printed circuit board 150 to the mold frame 130, in addition to inserting the boss 132 of the mold frame 130 into the insertion hole 152 of the flexible printed circuit board 150, a double-sided adhesive tape (not shown) may be further attached to a surface on which the flexible printed circuit board 150 contacts the mold frame 130.

Figure 4:
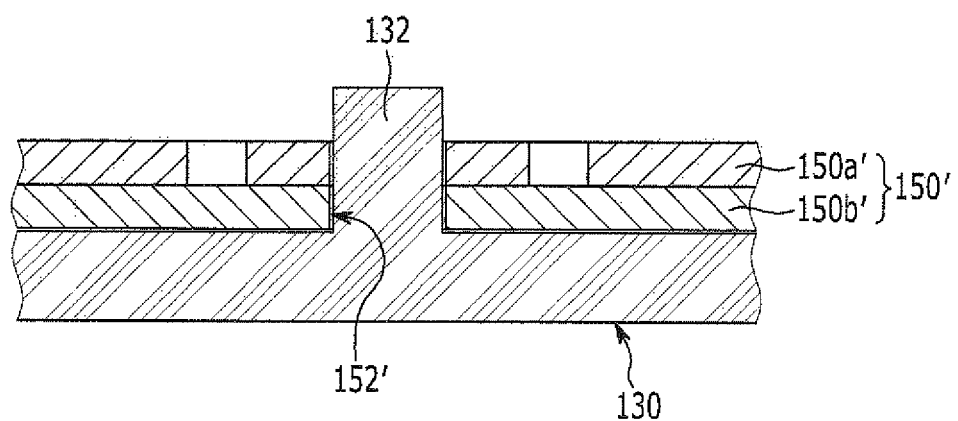
FIG. 4 is a cross-sectional view of a combination of a flexible printed circuit board and a mold fame according to a second exemplary embodiment of the invention.

FIG. 4 is a cross-sectional view of a combination of a flexible printed circuit board and a mold fame according to a second exemplary embodiment of the invention. A configuration of the backlight assembly according to the second exemplary embodiment will be described with reference to FIG. 4. In describing the second exemplary embodiment, the same configuration as the first exemplary embodiment will be briefly described or the description thereof will be omitted.

A flexible printed circuit board 150' according to the second exemplary embodiment includes a conductor 150a' and a base film 150b'. The base film 150b' is made of any one of polyimide, polyester, and polyethylene naphthalate, and the conductor 150a' is formed of a copper foil.

The flexible printed circuit board 150' according to the second exemplary embodiment is provided with an insertion hole 152' into which the boss 132 of the mold frame 130 is inserted. In this case, the conductor 150a' is formed around the circumference of the insertion hole 152', such that the boss 132 is stably fixed in the insertion hole 152'. That is, holes are formed in the conductor 150a' and the base film 150b', respectively, and communicate with each other so as to form the insertion hole 152'.

Meanwhile, when the conductor 150a' formed of the copper foil is exposed to the outside, it is vulnerable to electrostatic discharge (ESD), such that electric devices may be damaged.

Therefore, referring to FIG. 4, in the flexible printed circuit board 150' according to the second exemplary embodiment, the conductor 150a' formed around the circumference of the insertion hole 152' is formed in a band shape. That is, a groove of the conductor 150a' is formed so as to be spaced apart from the insertion hole 152'.

As such, in the backlight assembly according to the second exemplary embodiment, the conductor 150a' having strong strength is formed around the circumference of the insertion hole 152' of the flexible printed circuit board 150', such that the flexible printed circuit board 150' is stably fixed to the mold frame 130, thereby making it possible to improve the luminance and uniformity of the backlight. In addition, the conductor 150a' formed around the circumference of the insertion hole 152' is formed in a band shape, such that damage of the electrical devices due to electrostatic discharge may be suppressed.

Meanwhile, the first exemplary embodiment and the second exemplary embodiment describe, by way of example, a case wherein the conductor 150a is formed on one side of the base film 150b, but the conductor 150a may be formed on both sides of the base film 150b in some cases. That is, the conductor (not shown) pattern is further formed on the lower portion of the base film 150b, separately from the conductor 150a formed on the upper portion of the base film 150b, and holes for conducting the conductor 150a formed on the upper portion of the base film 150b and the conductor formed on the lower portion thereof may be formed, and then the inner surface of the holes may be plated.

In addition, as described above, an insulating film (not shown) for insulating the conductor 150a and protecting it from the external factors may be further formed on the upper portion of the conductor 150a.

Figure 5:
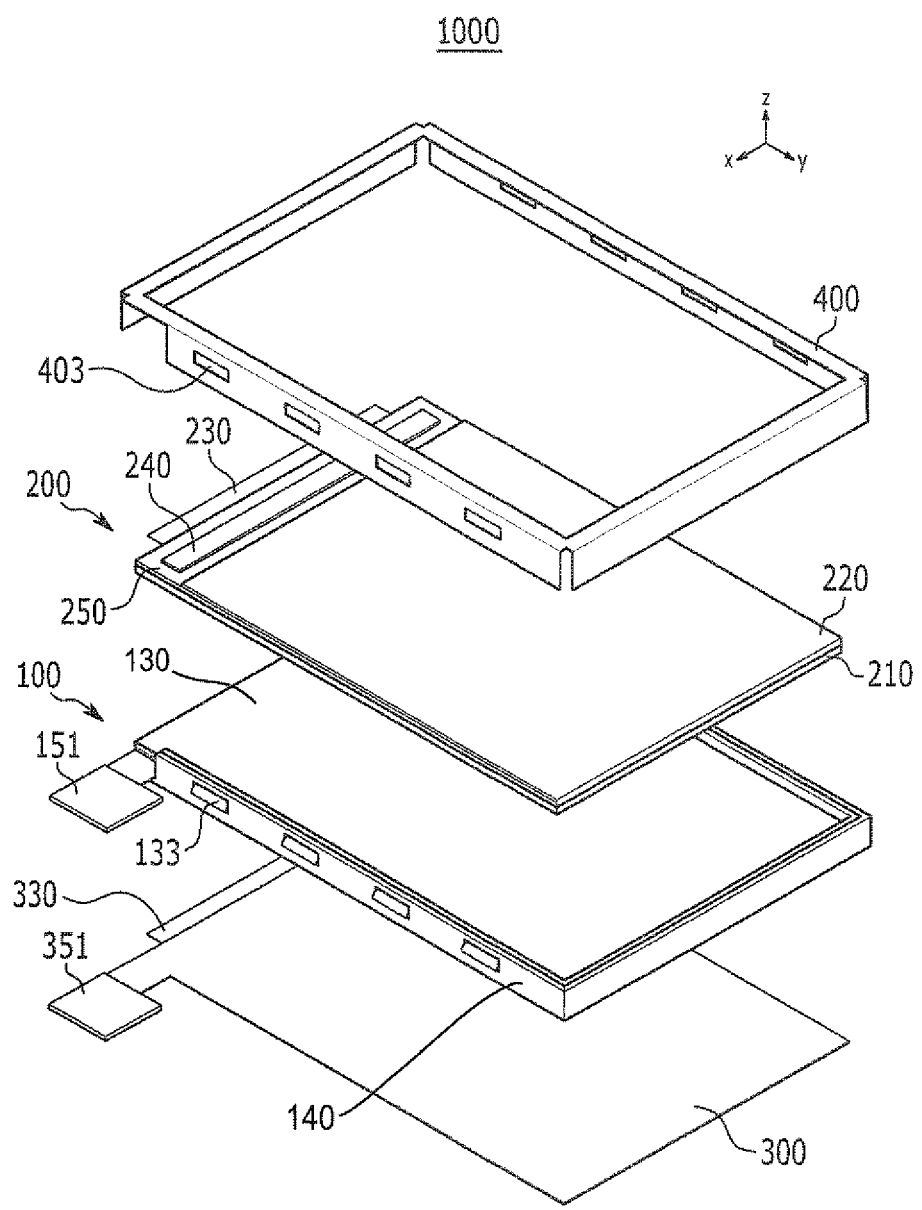
FIG. 5 is an exploded perspective view of a liquid crystal display according to an exemplary embodiment of the invention.

FIG. 5 is an exploded perspective view of a liquid crystal display (LCD) according to an exemplary embodiment of the invention.

A liquid crystal display (LCD) 1000 includes a liquid crystal display panel 200 and the backlight assembly 100 providing light thereto. The configuration of the backlight assembly 100 is described above, and therefore the contents thereof will be briefly described or omitted.

The liquid crystal display panel 200 is electrically connected to the flexible printed circuit board 300 through printed circuit films 230 and 330. FIG. 5 shows that the printed circuit films 230 and 330 are each disconnected from connection parts 151 and 351. In actuality, however, the printed circuit films 230 and 330 are connected to the connection parts 151 and 351. A flexible printed circuit board 300 supplies a driving voltage to the light source through the connection parts 151 and 351.

The liquid crystal display panel 200 includes a thin film transistor (TFT) substrate 210, a color filter substrate 220, and a liquid crystal (not shown) injected between both substrates 210 and 220. The thin film transistor substrate 210 and the color filter substrate 220 are disposed so as to face each other, and a plurality of pixels (not shown) are formed in a matrix form. A data line is connected to a source terminal of the thin film transistor substrate 210 and a gate line is connected to a gate terminal thereof. A conductive transparent electrode (for example, a pixel electrode made of indium tin oxide (ITO) or indium zinc oxide (IZO), etc.) is connected to the drain terminal thereof.

Since the data line and the gate line of the thin film transistor substrate 210 are connected to the flexible printed circuit board 300, when electric signals are inputted to the flexible printed circuit board 300, the electrical signals are inputted to the source terminal and the gate terminal of the thin film transistor. The thin film transistor is turned on or turned off according to the input of the electrical signals so as to output the electrical signals necessary to form pixels to the drain terminal. The integrated circuit chip 240 is mounted on the thin film transistor substrate 210 so as to control the liquid crystal display panel 200. The integrated circuit chip 240 generates a plurality of timing signals for applying a data driving signal and a gate driving signal at an appropriate timing, and then applies them to the data line and the gate line, respectively, of the liquid crystal display panel 200. A protective layer 250 is applied around the integrated circuit chip 240 so as to protect the integrated circuit chip 240.

A color filter substrate 220 is a substrate on which RGB pixels, which are color pixels expressing predetermined colors by light passing therethrough, are formed by a thin film process. A common electrode, formed of a transparent electrode such as ITO or IZO, is applied over the substrate 220. When the thin film transistor is turned on by applying power to the gate terminal and the source terminal of the thin film transistor, an electric field is formed between a pixel electrode of the thin film transistor substrate 210 and a common electrode of the color filter substrate 220. An alignment angle of the liquid crystal injected between the thin film transistor substrate 210 and the color filter substrate 220 is changed by the electric field, and light transmittance is changed according to the changed alignment angle, thereby making it possible to obtain the desired pixels. Meanwhile, a polarizing plate (not shown) may be attached to both surfaces of the liquid crystal display panel 200, and it polarizes light passing through the liquid crystal display panel 200.

After the flexible printed circuit board 300 is disposed on the lower portion of the backlight assembly 100, and the liquid crystal display panel 200 is disposed on or above the backlight assembly 100, the upper fixing member 400 is disposed so as to cover the liquid crystal display panel 200, etc. Fastening holes 403 formed on the upper fixing member 400 are coupled with the fastening protrusions 133 of the mold frame 130 so as to attach the upper fixing member 400 to the side surface of the lower fixing member 140, such that the liquid crystal display panel 200 may be firmly received in the liquid crystal display 1000.

In the backlight assembly 100 of the liquid crystal display (LCD) 1000, the insertion holes are formed on the flexible printed circuit board 300 and the boss formed on the mold frame 130 is inserted into the insertion holes, such that the flexible printed circuit board 300 is fixed to the mold frame 130. In this case, the conductor formed of a copper foil is formed at the circumference of the insertion hole to stably fix the flexible printed circuit board 300 to the mold frame 130, such that light emitting from the light emitting diode may be uniformly incident on the light guide panel without being leaked. As a result, the luminance and uniformity of the backlight is improved, thereby making it possible to improve the display quality of the liquid crystal display.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A backlight assembly, comprising:
a light source;
a flexible printed circuit board including a base film and conductors, and mounted with the light source;
a light guide panel into which light emitted from the light source is incident; and
a mold frame including an opening receiving the light guide panel and a boss fixing the flexible printed circuit board,
the flexible printed circuit board provided with an insertion hole into which the boss is inserted, the conductors formed along the circumference of the insertion hole, and an inner diameter of the conductors formed along the circumference of the insertion hole being the same as an inner diameter of the insertion hole.

2. The backlight assembly of claim 1, wherein the conductors formed along the circumference of the insertion hole are formed in a band shape.

3. The backlight assembly of claim 1, wherein the base film is formed on a lower portion of the conductors formed along the circumference of the insertion hole, and an inner diameter of the base film is the same as the inner diameter of the insertion hole.

4. The backlight assembly of claim 3, wherein the flexible printed circuit board further includes a second conductor formed on a lower portion of the base film along the circumference of the insertion hole.

5. The backlight assembly of claim 3, wherein the flexible printed circuit board further includes an insulating film formed on an upper portion of the conductor.

6. The backlight assembly of claim 1, wherein the inner diameter of the insertion hole is about 5% to 15% larger than an outer diameter of the boss.

7. The backlight assembly of claim 1, wherein the conductors are formed of a copper foil.

8. The backlight assembly of claim 1, wherein the base film includes any one of polyimide (PI), polyester (PET), and polyethylene naphthalate (PEN).

9. The backlight assembly of claim 1, further comprising an adhesive formed between the conductors and the base film.

10. A liquid crystal display, comprising:
a liquid crystal display panel; and
a backlight assembly, the backlight assembly including:
a light source;
a flexible printed circuit board including a base film and conductors, and mounted with the light source;
a light guide panel into which light emitted from the light source is incident; and
a mold frame including an opening for receiving the light guide panel and a boss for fixing the flexible printed circuit board,
the flexible printed circuit board provided with an insertion hole into which the boss is inserted, the conductors formed along the circumference of the insertion hole, and an inner diameter of the conductors formed along the circumference of the insertion hole being the same as an inner diameter of the insertion hole.

11. The liquid crystal display of claim 10, wherein the conductors formed along the circumference of the insertion hole are formed in a band shape.

12. The liquid crystal display of claim 10, wherein the base film is formed on a lower portion of the conductors formed along the circumference of the insertion hole, and an inner diameter of the base film is the same as the inner diameter of the insertion hole.

13. The liquid crystal display of claim 12, wherein the flexible printed circuit board further includes a second conductor formed on a lower portion of the base film along the circumference of the insertion hole.

14. The liquid crystal display of claim 12, wherein the flexible printed circuit board further includes an insulating film formed on an upper portion of the conductor.

15. The liquid crystal display of claim 10, wherein the inner diameter of the insertion hole is about 5% to 15% larger than an outer diameter of the boss.

16. The liquid crystal display of claim 10, wherein the conductors are formed of a copper foil.

17. The liquid crystal display of claim 10, wherein the base film includes any one of polyimide, polyester, and polyethylene naphthalate (PEN).

18. The liquid crystal display of claim 10, further comprising an adhesive formed between the conductors and the base film.

* * * * *